(12) United States Patent
Zauner et al.

(10) Patent No.: US 6,691,649 B2
(45) Date of Patent: Feb. 17, 2004

(54) FUEL INJECTION SYSTEM FOR A TWO-STROKE ENGINE

(75) Inventors: Günter Zauner, Peuerbach (AT); Michael Seyrl, Wels (AT)

(73) Assignee: Bombardier-Rotax GmbH, Gunskirchen (AT)

(*) Notice: Subject to any disclaimer, the term of this patent is extended or adjusted under 35 U.S.C. 154(b) by 0 days.

(21) Appl. No.: 09/906,759

(22) Filed: Jul. 18, 2001

(65) Prior Publication Data

US 2002/0011223 A1 Jan. 31, 2002

Related U.S. Application Data

(60) Provisional application No. 60/219,012, filed on Jul. 19, 2000.

(51) Int. Cl.$^7$ ................................................ F02B 33/04
(52) U.S. Cl. ................................. 123/73 B; 123/73 PP
(58) Field of Search ........................ 123/73 B, 73 C, 123/73 A, 299, 300, 301, 73 BA

(56) References Cited

U.S. PATENT DOCUMENTS

| | | |
|---|---|---|
| 3,612,014 A | 10/1971 | Tenney |
| 3,707,955 A | 1/1973 | Ulbing |
| 3,740,172 A | 6/1973 | Ulbing |
| 3,800,754 A | 4/1974 | Carlson et al. |
| 3,805,758 A | 4/1974 | May |
| 3,818,884 A | 6/1974 | Pfender |
| 3,822,682 A | 7/1974 | Sherwood |
| 3,834,678 A | 9/1974 | Baribeau et al. |
| 3,848,858 A | 11/1974 | Page et al. |
| 3,849,036 A | 11/1974 | Read |
| 3,868,822 A | 3/1975 | Keller |
| 3,905,340 A | 9/1975 | Boyesen |
| 3,905,341 A | 9/1975 | Boyesen |
| 4,000,723 A | 1/1977 | Boyesen |
| 4,051,820 A | 10/1977 | Boyesen |
| 4,143,626 A | 3/1979 | Boyesen |
| 4,161,163 A | 7/1979 | Boyesen |
| 4,202,298 A | 5/1980 | Boyesen |
| 4,202,299 A | 5/1980 | Boyesen |
| 4,233,206 A | 11/1980 | Katsura et al. |
| 4,253,433 A * | 3/1981 | Blair ........................ 123/73 R |
| 4,265,163 A | 5/1981 | Arao et al. |
| 4,323,043 A | 4/1982 | Alderson |
| 4,461,260 A | 7/1984 | Nonaka et al. |
| 4,469,054 A * | 9/1984 | Onishi et al. ............. 123/73 R |
| 4,509,471 A | 4/1985 | Eberline et al. |
| 4,638,770 A * | 1/1987 | Fox ........................... 123/65 P |
| 4,712,524 A | 12/1987 | Smith et al. |
| 4,779,581 A | 10/1988 | Maier |
| 4,781,155 A | 11/1988 | Brucker |
| 4,809,179 A | 2/1989 | Klinger et al. |
| 4,838,214 A | 6/1989 | Barrett |
| 4,876,991 A | 10/1989 | Galitello, Jr. |
| 4,899,610 A | 2/1990 | Bourret |
| 4,899,698 A | 2/1990 | Thery |
| 4,901,701 A | 2/1990 | Chasteen |
| 4,967,712 A | 11/1990 | Chasteen |
| 4,969,329 A | 11/1990 | Bolton et al. |

(List continued on next page.)

FOREIGN PATENT DOCUMENTS

| | | |
|---|---|---|
| DE | 39 13 629 A1 | 11/1989 |
| DE | 37 44 609 A1 | 7/1998 |
| EP | 0 302 045 B2 | 2/1989 |

*Primary Examiner*—Henry C. Yuen
*Assistant Examiner*—Hai Huynh
(74) *Attorney, Agent, or Firm*—Pillsbury Winthrop LLP

(57) ABSTRACT

An internal combustion, two stroke engine is disclosed. The engine includes a crankcase with a cylinder adapted to house a piston. At least one transfer duct communicates the crankcase to the cylinder. At least one fuel injector is disposed through a wall of the transfer duct. The fuel injector is positioned to inject fuel tangentially to the cylinder.

33 Claims, 4 Drawing Sheets

U.S. PATENT DOCUMENTS

| | | | |
|---|---|---|---|
| 5,020,484 A | | 6/1991 | Ishikawa et al. |
| 5,024,205 A | | 6/1991 | Gatza et al. |
| 5,048,470 A | | 9/1991 | Geddes et al. |
| 5,048,503 A | | 9/1991 | Suzuki et al. |
| 5,050,559 A | | 9/1991 | Kurosu et al. |
| 5,050,564 A | | 9/1991 | Suzuki et al. |
| 5,074,271 A | | 12/1991 | Suzuki et al. |
| 5,090,386 A | | 2/1992 | Kurosu et al. |
| 5,099,813 A | | 3/1992 | Kurosu et al. |
| 5,117,932 A | | 6/1992 | Kurosu et al. |
| 5,152,365 A | | 10/1992 | Aoshima |
| 5,172,675 A | | 12/1992 | Kurosu et al. |
| 5,191,531 A | | 3/1993 | Kurosu et al. |
| 5,205,255 A | | 4/1993 | Yamagata et al. |
| 5,218,941 A | | 6/1993 | Suzuki et al. |
| 5,233,965 A | | 8/1993 | Ishikawa et al. |
| 5,249,557 A | * | 10/1993 | Katoh et al. ................ 123/305 |
| 5,284,117 A | | 2/1994 | Akase |
| 5,341,786 A | | 8/1994 | Abe et al. |
| 5,408,975 A | | 4/1995 | Blakeslee et al. |
| 5,441,030 A | | 8/1995 | Satsukawa |
| 5,445,121 A | | 8/1995 | Kai |
| 5,462,031 A | | 10/1995 | Kai |
| 5,477,827 A | | 12/1995 | Weisman, II et al. |
| 5,479,909 A | | 1/1996 | Blakeslee et al. |
| 5,482,021 A | | 1/1996 | Roche |
| 5,490,483 A | * | 2/1996 | Tanikake et al. ........... 123/65 P |
| 5,507,260 A | * | 4/1996 | Hintzen ...................... 123/299 |
| 5,510,657 A | | 4/1996 | Morita |
| 5,517,951 A | | 5/1996 | Paul et al. |
| 5,653,787 A | | 8/1997 | Poirier |
| 5,717,130 A | | 2/1998 | Xu et al. |
| 5,732,676 A | | 3/1998 | Weisman et al. |
| 5,740,767 A | * | 4/1998 | Kaku et al. ............... 123/65 W |
| 5,740,783 A | | 4/1998 | Learman et al. |
| 5,762,040 A | | 6/1998 | Taipale et al. |
| 5,791,304 A | * | 8/1998 | Taipale ..................... 123/73 C |
| 5,806,473 A | * | 9/1998 | Kometani et al. ........ 123/73 C |
| 5,813,374 A | | 9/1998 | Chasteen |
| 5,816,221 A | | 10/1998 | Krueger |
| 5,866,520 A | | 2/1999 | Addagarla et al. |
| 5,870,981 A | * | 2/1999 | Knaus et al. ............. 123/65 A |
| 5,967,108 A | | 10/1999 | Kutlucinar |
| 5,970,945 A | | 10/1999 | Holtermann |
| 5,979,402 A | | 11/1999 | Melbourne |
| 5,983,851 A | * | 11/1999 | Kimijima et al. ...... 123/196 M |
| 5,984,232 A | | 11/1999 | Delorio, Jr. |
| 5,992,358 A | * | 11/1999 | Otome ..................... 123/65 P |
| 6,016,655 A | | 1/2000 | Boswell |
| 6,032,752 A | | 3/2000 | Karpik et al. |
| 6,040,279 A | | 3/2000 | Addagarla et al. |
| 6,062,202 A | | 5/2000 | Chasteen |
| 6,073,613 A | | 6/2000 | Warner |
| 6,079,379 A | | 6/2000 | Cobb, Jr. |
| 6,082,334 A | | 7/2000 | Shomura et al. |
| 6,098,574 A | | 8/2000 | Arakawa et al. |
| 6,116,222 A | | 9/2000 | Warren |
| 6,155,374 A | | 12/2000 | Uchida |
| 6,216,809 B1 | | 4/2001 | Etou et al. |
| 6,298,822 B1 | * | 10/2001 | Radue ........................ 123/299 |
| 6,360,714 B1 | * | 3/2002 | Kotooka et al. ............ 123/299 |
| 6,367,432 B1 | * | 4/2002 | Araki ....................... 123/73 R |
| 2001/0029912 A1 | * | 10/2001 | Laimbock ............... 123/73 PP |

* cited by examiner

FUEL INJECTION SYSTEM FOR A TWO-STROKE ENGINE

CROSS REFERENCE TO RELATED APPLICATION

This application claims the benefit of priority to U.S. Patent Application No. 60/219,012, filed Jul. 19, 2000, the contents of which are herein incorporated by reference.

FIELD OF THE INVENTION

The present invention relates to a fuel injection system for a two-stroke engine. In particular, the present invention concerns a fuel injection system for a two-stroke engine with crankcase scavenging, with at least one transfer duct. The transfer port to the transfer duct, which opens into the cylinder, is controlled by the engine piston. A fuel injector is positioned in the transfer duct, the injection jet from the injector being directed onto the side of the piston crown that is proximate to the combustion chamber, the axis of the injection jet subtending an angle of less than 90° with the axis of the piston. The injection jet is directed, for the most part at least, onto that half of the piston crown that is opposite the exhaust port.

BACKGROUND OF THE INVENTION

European Patent No. 302 045 B2 describes a two-stroke engine in which the injector is configured as a multi-orifice injector, and in which the injection process for the range of higher engine speeds begins before the transfer port of the transfer duct is uncovered by the piston, so that some of the fuel can be pre-vaporized in the transfer duct. This is necessary, in particular, if the amount of time required for injection exceeds the amount of time for which the transfer ducts are open, as may be the case at very high engine speeds. In such a case, however, one disadvantage is that essentially injection takes place radially to the cylinder wall, and in the direction of the scavenging gas flowing into the cylinder by way of the transfer ducts. When this happens, it is scarcely possible to avoid unburned fuel flowing out of the combustion chamber into the exhaust, and this in its turn results in a loss of fuel and increased hydrocarbon emissions.

In order to prevent or reduce the fuel-air mixture from flowing through the combustion chamber into the exhaust to the maximum possible extent, in a modified version of the two-stroke engine described heretofore, European Patent No. 302 045 B2 proposes that the piston be configured as a deflector-crown piston that has a rounded, concave deflector surface on the same side as the transfer port. The jet from the injector is directed, at least in part, onto said deflector surface. (See also Austrian Patent No. 3 394 U1).

U.S. Pat. No. 4,779,581 describes another two-stroke engine, in which fuel is injected in the same direction as the scavenging gas that is flowing into the cylinder. In this engine, the fuel is injected in the direction of the spark plug, away from the top surface of the piston.

It is also known that low-pressure injectors can be used. Low pressure injectors introduce the fuel directly into the combustion chamber when the piston has uncovered the exhaust duct or transfer ducts. (See, e.g., U.S. Pat. No. 5,762,040, German Patent No. 39 13 629 C2, and German Patent No. 37 44 609 A1.) However, according to these publications, because the fuel is injected not into the transfer duct but rather directly into the cylinder through a separate port, injection can only take place once the piston has uncovered the injection port. Otherwise, the fuel mixture would be injected directly onto the piston skirt, which, on the one hand, would result in inadequate preparation of the mixture and, on the other, would result in the film of lubricating oil being washed off the piston and this, in turn, would increase the danger of damage being done to the engine.

The same difficulty arises with European Patent No. 302 045 B2 and Austrian Patent No. 3 394 U1. In both engine designs, the injector nozzles open out into the transfer ducts. Although the injectors are almost perpendicular to the piston skirt, namely, the side of the piston skirt that is most greatly stressed (the cyclic pressure and back-pressure side), in the case of advanced injection of fuel before the edge of the transfer port is uncovered by the piston, the film of lubricating oil is washed off the piston, thereby curtailing the service life of the engine.

In addition, German Patent No. 37 44 609 describes the use of at least two injectors, each injector having its own, dedicated fuel-supply. In this engine, it is possible to activate each injector separately as a function of the operating parameters of the engine.

According to U.S. Pat. No. 5,762,040, two direct-injection low-pressure injectors can be provided for each cylinder. These injectors inject fuel directly into the cylinder and are connected to a common fuel-supply system. As before, the injectors are directed essentially towards the exhaust duct, so that a not insignificant loss of fuel, and the concomitant escape of unburned gasoline, have to be taken into account.

As indicated, in each of the prior art two-stroke engine designs, the fuel injection systems do not provide reduced emissions across a wide range of engine operating speeds.

In addition, the prior art engines also experience a decrease in performance across a range of operating parameters in addition to experiencing an increase in unwanted exhaust emissions.

SUMMARY OF THE INVENTION

Therefore, it is an object of the present invention to provide a fuel injection system for a two-stroke engine that maintains or increases performance of the engine across a range of operating parameters while also reducing exhaust emissions from the engine by solving the problems of the prior art listed above.

Accordingly, one aspect of the present invention is the provision of at least two fuel injectors, disposed so as to be essentially parallel to each other and so as to subtend an angle of 20° to 50°, preferably 35°, with the axis of the cylinder, the injector being directed towards the side of the piston crown that is proximate to the combustion chamber. The fuel injectors open out into the side transfer ducts, preferably one injector into one side transfer duct on the left-hand side and one on the right-hand side, adjacent to a rear boost port. The arrangement of the fuel injectors in the side transfer ducts means that the fuel that is added to the gas (air or a combination of air, vaporized fuel, and/or oil (among other components)) is always injected almost perpendicularly (i.e., across and partly against) to the gas flowing into the combustion chamber. This results in the greatest possible flow differential between the inflowing gas and the fuel that is injected, and results in superior, favourable mixing conditions. Arrangement of the fuel injectors in this manner also permits the complete (or nearly complete) vaporization of the fuel and also prevents unburned hydrocarbons from being exhausted from the cylinder, since no unvaporized fuel can be sprayed into the exhaust.

According to the present invention, it is preferred that the injectors be configured as multi-orifice injectors, since these generally provide for finer vaporization as compared to single-orifice nozzles, given identical injection parameters (i.e., pressure, flow, etc.).

During development of the present invention, the inventors realized that, primarily in the range of greater engine speeds and loads when the amount of time available for injecting the fuel is very small, the fuel can be injected before the transfer port to the side transfer duct is uncovered. This means that some of the fuel can be pre-vaporized in the transfer duct. This ensures that sufficient fuel can be introduced into the cylinder, even at high engine speeds.

To be able to match the quantity of fuel that is introduced into the cylinder to particular demands, such as load and engine speed, the injectors may be activated independently of each other. Thus, in the partial-load range, only one of the two injectors may be active and, in contrast to this, when the engine is under full load, both the injectors may supply fuel to the cylinder. With such an arrangement, it also may be possible to have the injectors work in alternation when the engine is operating under partial load, so as to avoid localized overheating of the engine. To this end, one injector is activated for one cycle, and the other injector is activated for the subsequent cycle.

Another way of matching the quantity of fuel injected to the load on the engine is to use two injection valves of different sizes, which is to say, valves with different flow characteristics. The smaller of the two is designed to deliver fuel mainly when the engine is idling or running under partial load. The other is activated only when the engine is operating under a specific load or at a specific speed, so that the demand for fuel can be satisfied, especially when the engine is operating under full load.

BRIEF DESCRIPTION OF THE DRAWINGS

An example of the objects of the present invention is shown in the drawings appended hereto, like reference numbers indicating like parts throughout. In the drawings.

DETAILED DESCRIPTION OF THE PREFERRED EMBODIMENTS

Figure 1:
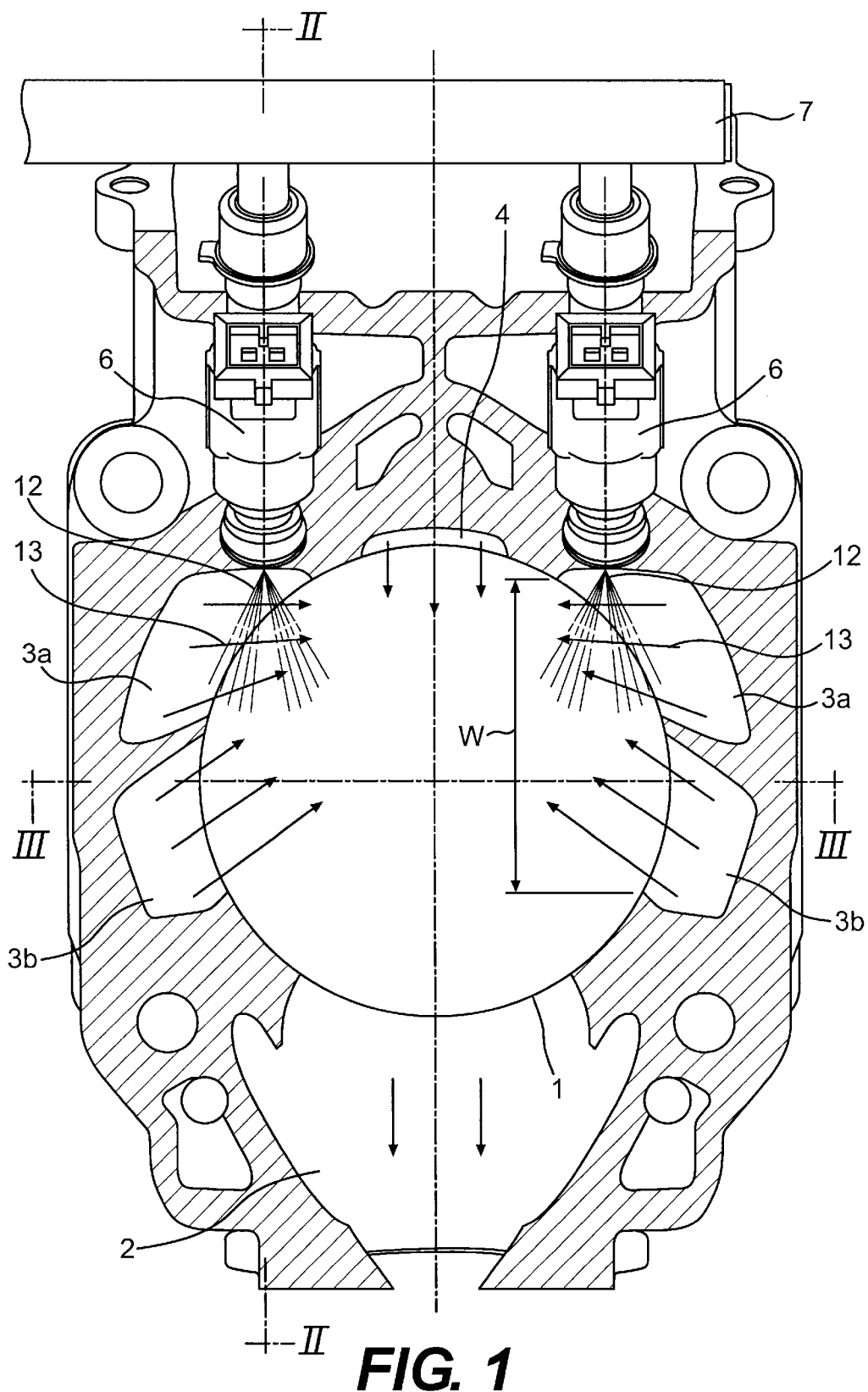
FIG. 1 is a partial cross-section of one embodiment of an injection system according to the present invention, as viewed from above.

As shown in the accompanying figures and as is conventionally known, a two-stroke engine includes a cylinder 1 having an exhaust port 2, side transfer ports 3, and a rear boost port 4. The cylinder 1 is mounted to a crankcase 9 and a cylinder head 8 is mounted to the cylinder 1 to close the cylinder 1. A reed valve 5 is mounted in the intake path of the cylinder 1 and allows air to pass from the atmosphere to the crankcase 9. In other known embodiments, the reed valves can be mounted in the crankcase 9 itself.

Figure 3:
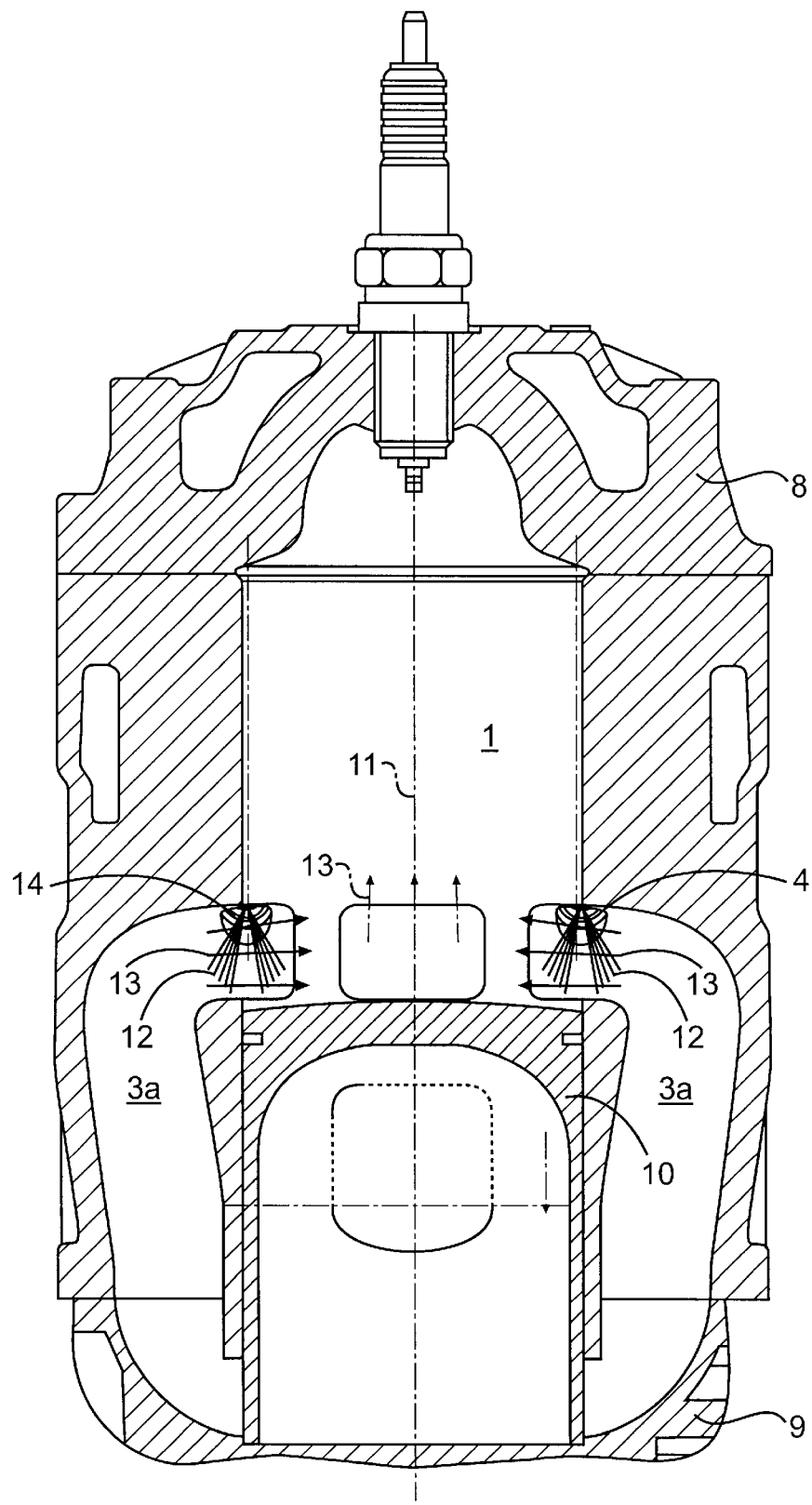
FIG. 3 shows the injection system in cross-section, taken on the line III—III shown in FIG. 1.
Figure 4:
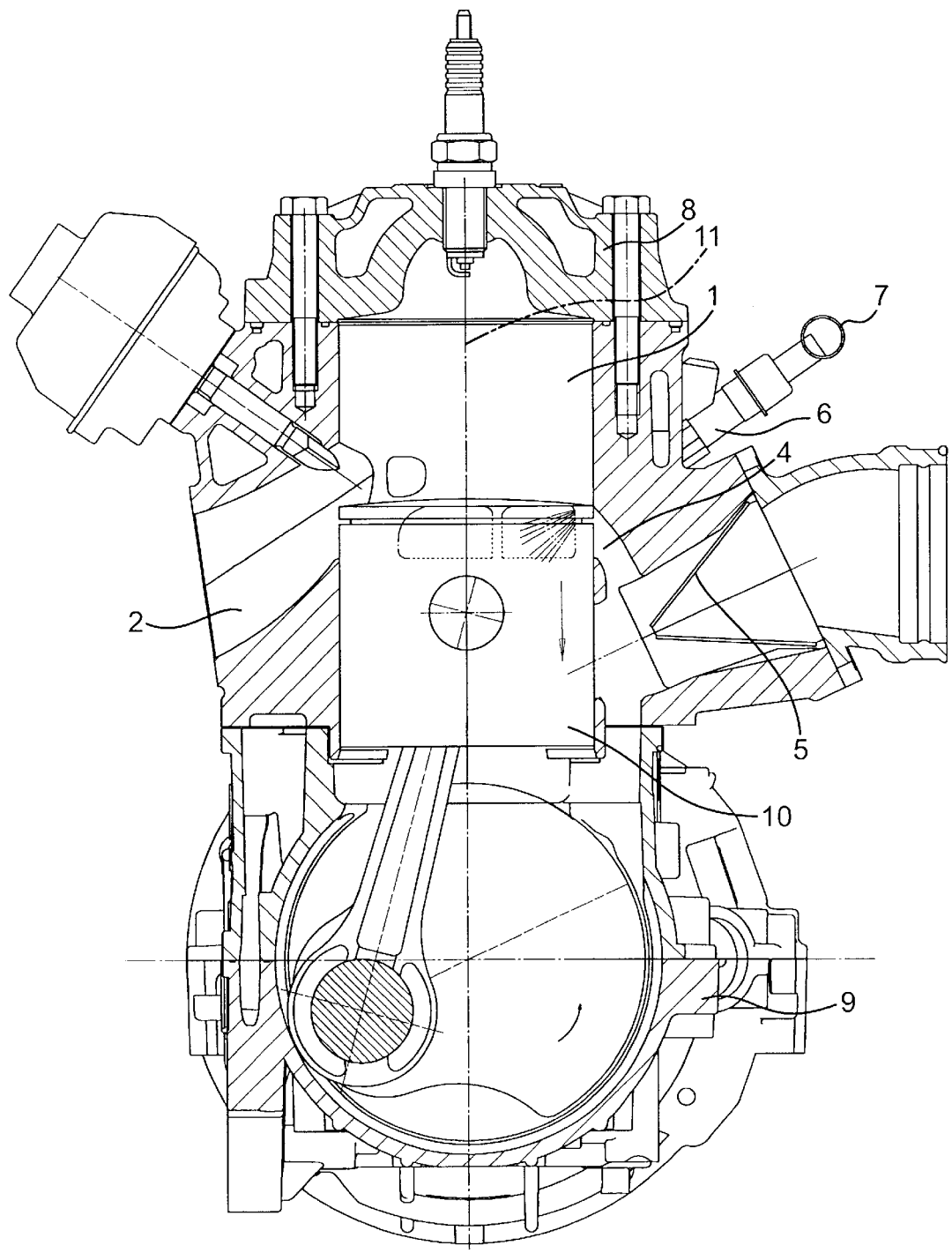
FIG. 4 depicts the injection system shown in FIG. 1, together with crankcase, in partial cross-section, as viewed from the side.

In a conventional carbureted two-stroke engine, an air and fuel mixture is sucked into the crankcase 9 through the reed valve 5 as a piston 10 moves upward in the cylinder 1. When the piston 10 reaches the top of its stroke and begins moving downward in the cylinder, it compresses the air and fuel charge in the crankcase 9, thereby closing the reed valve 5. (See FIG. 4.) When the piston has moved downward in the cylinder sufficiently to open the transfer ports 3a, 3b and rear boost port 4, the compressed air and fuel charge is pushed upward through these ports into the cylinder 1. (See, e.g., FIGS. 1 and 3.) This charge also serves to push the spent exhaust gases from the previous combustion out of the cylinder through the exhaust port 2. However, considering all of the operating parameters of the engine, it is difficult to do this without either having incomplete scavenging of the exhaust gases from the cylinder or pushing some of the air and fuel charge into the exhaust port. Both occurrences affect the performance of the engine but the latter also increases hydrocarbon emissions from the engine since unburned fuel is being exhausted into the atmosphere.

Figure 2:
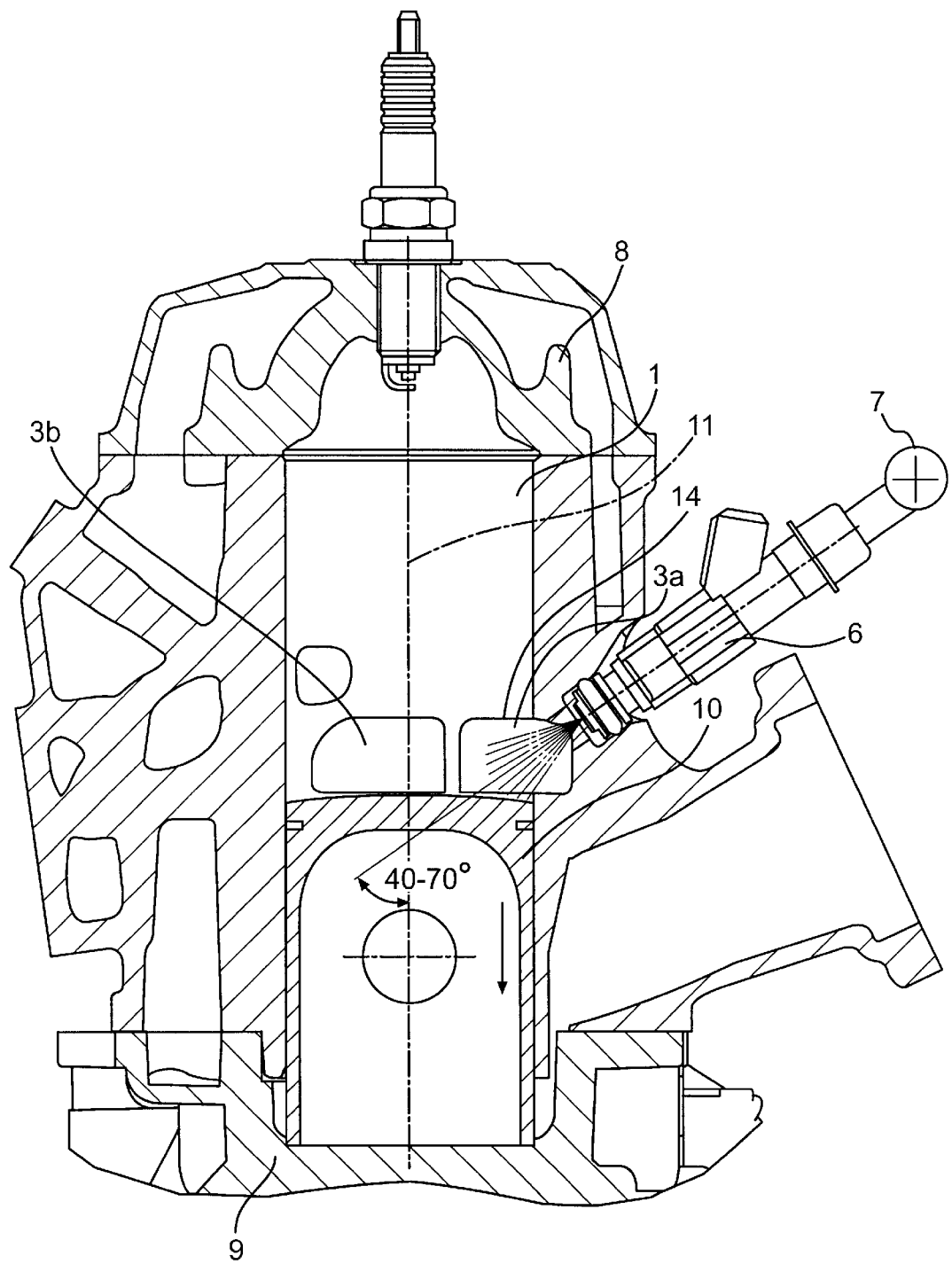
FIG. 2 illustrates the injection system in cross-section, taken on the line II—II shown in FIG. 1.

In the present invention, two fuel injectors 6 are mounted beside the rear boost port 4. They are also mounted to have a downward angle of injection into the cylinder, with the angle preferably being approximately 35° from a plane normal to an axis of the cylinder. As would be appreciated by those skilled in the art, however, the angle can be varied, as appropriate, to achieve desired operating conditions of the engine. It has been shown, however, that the angle preferably should be within the range of 20° to 50° in order to achieve satisfactory results with respect to engine performance and emissions. FIG. 2 illustrates the range of the complementary angles between 40° and 70°. The fuel is not injected radially, towards the center of the cylinder, as in the prior art. Instead, it is injected tangentially to the cylinder 1. As shown, the fuel is injected in a direction substantially parallel to a plane bisecting the cylinder 1 through its center point.

It is preferred that the two injectors 6 be disposed so as to be parallel to each other. So arranged, the two injectors 6 can be supplied with fuel very simply by way of a common fuel rail 7; this is particularly so when a number of cylinders are disposed in a row. Each injector 6 opens out into one of the side transfer ducts 3a that are located alongside the rear boost port 4. The injectors 6 thus inject the fuel almost perpendicularly (i.e., across and partly against) to the gas 13 that is flowing into the cylinder through the side transfer ducts 3a (the flow patterns of the gas that enters the cylinder through the various ports are indicated by the arrows shown in the drawings). This results in the best possible vaporization of the fuel 12 and the best possible mixing with the gas 13 that enters the cylinder by way of the transfer ducts. Furthermore, injection takes place at the upper edge 14 of the side transfer ports 3a, where the flow velocity is greatest when the gas 13 flows into the cylinder 1, so that the fuel and air are mixed even more thoroughly. The gas 13 flowing into the cylinder 1 transversely to the injection jet 12 also acts as a barrier, because it prevents the fuel that is injected from flowing across the cylinder 1 into the exhaust port 2.

The flow of gas 13 that emerges from the rear boost port 4 and which is directed upward (see FIG. 3) does not interact directly with the injected fuel 12. However, because the flow of gas 13 causes the flows of gas emerging from the transfer ports 3a, 3b to flow upward (i.e., it deflects them towards the cylinder head), it ensures that the injected fuel 12 is also deflected in this direction, so that all of the fuel is burned.

In addition, injection takes place in the direction of the maximum width W of the side transfer ducts 3a, 3b and not across the low height of the transfer port 3a. Accordingly, injections taken place from the upper edge 14 of the transfer port towards the lower edge of the transfer port, as was usually the case in the prior art.

Even though the major portion of the fuel 12 that is injected is directed onto the half of the piston that is remote from the exhaust port 2, some of the injected fuel can nevertheless interact with the gas emerging from the transfer ducts 3b that are more remote from the point of injection. This is further facilitated in that the flow of gas from the side transfer ducts 3b is not oriented radially inward, but rather in the direction toward the rear boost port 4, so that at least a considerable component of the gas flow is directed against the injection jet 12. In this way, mixing is improved to an even greater extent, and it is ensured that the fuel 12 that is injected cannot enter the exhaust port 2.

Because of the fact that the injectors 6 are inclined slightly towards the side of the piston 10 that is proximate to the combustion chamber, a certain amount of fuel 12 can reach the crown of the piston, vaporize on this, and thus cool the piston as ;a result of the heat loss caused by this vaporization.

As indicated above, it is preferred that fuel be supplied to the fuel injectors 6 through a common fuel rail 7. However, as would be appreciated by those skilled in the art, the fuel injectors 6 may be supplied with fuel from separate fuel lines.

Under partial load conditions, the timing of the injection of the fuel from the fuel injectors into the cylinder will preferably be delayed until later in the scavenging phase (but prior to closing of the scavenging ports 3a, 3b and 4 by the piston 10). This delay in injecting fuel into the cylinder reduces or eliminates unburned fuel from escaping out of the exhaust port to the atmosphere during operation of the engine. The operating conditions of the engine, such as throttle opening, engine speed ("rpm"), etc., will dictate the amount of fuel injected by the injectors during each injection cycle.

The amount of fuel injected during each injection cycle is generally controlled by the length of the injection cycle. Therefore, at operating conditions requiring higher amounts of fuel, e.g. under full load condition, the duration of the injection cycle will be longer. This may require that the injection cycle starts sooner (as compared with lower fuel requiring conditions) to provide sufficient time for the injection cycle prior to closing of the scavenging ports. When the engine is running under full load, injection can take place before the piston 10 begins to uncover the transfer ducts. (See FIG. 4.) In this case, a large part of the fuel 12 that is injected strikes the hot piston skirt, where it is prevaporized and is carried into the cylinder 1 by the flow of gas, once the transfer duct 3a has been uncovered.

This earlier injection of the fuel into the cylinder 1 is still less likely to result in unburned fuel escaping out of the exhaust port as compared with a carbureted engine, since the expansion chamber will generally be tuned for such operating conditions to prevent the escape of unburned fuel into the atmosphere.

The use of multiple fuel injectors increases the fuel delivery capacity of the injection system and provides for shorter injection cycles. This is especially important at high rpm and full throttle (i.e., throttle opened to a great extent) conditions where the time available for injection is smaller (due to the high rpm) but the amount of fuel required is larger. Alternatively, three or more fuel injectors can be used per cylinder in more demanding applications, as can one fuel injector per cylinder in less demanding applications. Furthermore, the use of multiple fuel injectors can be staged such that one fuel injector operates at less demanding operating conditions and a second (or further) injector begins operation at more demanding conditions to supplement the fuel delivery by the first fuel injector. Moreover the fuel injectors do not necessarily need to be of the same size or type. Quite contrary to this one fuel injector could be designed to be smaller than the other one and be operated only under idle speed and under part load to provide better sensibility and reproducibility under these operating conditions where small quantities of fuel are demanded.

In the preferred embodiment, the control of the fuel injectors is by an Electronic Control Unit, ("ECU"). The ECU takes into account one or more operating conditions, such as throttle opening, rpm, engine temperature, atmospheric temperature, barometric pressure, etc., determines the appropriate fuel delivery for such conditions, and controls the fuel injectors to deliver the desired amount of fuel.

The reduction of emissions due to the present fuel injection system can be complemented by the use of a catalytic converter in the exhaust system and reductions of oil supplied to the engine for lubrication, for instance, due to more precise metering and spot delivery.

The present invention was developed preferably to meet the operating requirements of a snowmobile. As would be appreciated by those skilled in the art, snowmobiles operate at high engine speeds and loads. As discussed, the fuel injection system of the present invention improves performance across a range of operating parameters, including high speed (and/or high load) operation. While designed with the requirement of a snowmobile in mind, however, the present invention could be applied to an engine designed for any type of vehicle including a personal watercraft, ATV, or the like.

The present invention is not meant to be limited solely to the embodiments described. To the contrary, the embodiments described may be modified in various ways without departing from the scope and, content of the present invention. Modifications that may be apparent (or will become apparent) to those skilled in the art are also intended to fall within the scope of the present invention.

What is claimed is:

1. An internal combustion, two stroke engine, comprising:
   a housing defining a crankcase and a cylinder, wherein the cylinder is adapted to house a piston;
   at least two transfer ducts in communication between the crankcase and the cylinder, the two transfer ducts being symmetrically disposed about a plane bisecting the cylinder;
   at least two fuel injectors, each being disposed through a wall of respective transfer ducts, the fuel injectors being symmetrically disposed about the plane bisecting the cylinder and being positioned to inject fuel at least partially into the cylinder in a direction substantially tangentially to the cylinder; and
   a boost port in communication between the crankcase and the cylinder and disposed between the transfer ducts and the fuel injectors, the boost port being intersected by the plane bisecting the cylinder,
   wherein the transfer ducts and the fuel injectors are disposed symmetrically on either side of the boost port.

2. The engine of claim 1, wherein the fuel injectors inject fuel in a direction substantially parallel to the plane bisecting the cylinder.

3. The engine of claim 1, wherein the fuel injectors are disposed substantially parallel to one another.

4. The engine of claim 1, further comprising:
   a fuel rail, wherein the fuel injectors are connected to the fuel rail.

5. The engine of claim 1, wherein: the transfer ducts each define an upper edge; and the fuel injectors each open into the respective transfer ducts through the upper edges thereof.

6. The engine of claim 5, wherein each fuel injector is disposed at an angle from horizontal between 20° and 50°.

7. The engine of claim 6, wherein the angle is about 35°.

8. The engine of claim 1, wherein: as the piston moves in the cylinder, gases flow through each transfer duct in a first direction from the crankcase into the cylinder, fuel is injected into each transfer duct in a second direction, and the injection of fuel in the second direction is across and partly against the flow of gases in the first direction.

9. The engine of claim 8, further comprising:

an exhaust port intersected by the plane bisecting the cylinder on a side of the cylinder opposite to where the boost port opens into the cylinder, wherein the exhaust port permits egress of burnt gases from the cylinder after combustion, and wherein the flow of gases in the first direction from the transfer ducts acts as a barrier inhibiting flow of fuel through the exhaust port before combustion thereof.

10. The engine of claim 1, wherein: the fuel injectors comprise a first and a second fuel injector, the first fuel injector is adapted to inject fuel at a first rate, the second fuel injector is adapted to inject fuel at a second rate, and the first rate does not equal the second rate.

11. The engine of claim 10, wherein the first rate is smaller than the second rate.

12. The engine of claim 1, wherein: the fuel injectors comprise a first and a second fuel injector, the first fuel injector is adapted to operate within a first range of engine operating conditions, and the second fuel injector is adapted to operate within a second range of engine operating conditions.

13. The engine of claim 12, wherein: the first range of engine operating conditions includes all engine speeds and loads, and the second range of engine operating conditions includes only high engine speeds and loads.

14. The engine of claim 13, wherein: the first fuel injector is adapted to inject fuel at a first rate, the second fuel injector is adapted to inject fuel at a second rate, and the second rate is greater than the first rate.

15. The engine of claim 1, wherein: the fuel injectors comprise a first and a second fuel injector, and the first fuel injector is adapted to operate alternatively with the second fuel injector.

16. The engine of claim 15, wherein: the first and second fuel injectors alternate injecting fuel so that each injector injects fuel on every other combustion cycle.

17. The engine of claim 1, wherein each of the fuel injectors open into the respective transfer ducts at a point where gas flowing through the transfer ducts moves at its greatest velocity.

18. An internal combustion, two stroke engine, comprising:

a housing defining a crankcase and a cylinder, wherein the cylinder is adapted to house a piston;

at least two transfer ducts in communication between the crankcase and the cylinder, the two transfer ducts being symmetrically disposed about a plane bisecting the cylinder;

at least two fuel injectors, each being disposed through a wall of respective transfer ducts and positioned to inject fuel at least partially into the cylinder, the fuel injectors being symmetrically disposed about the plane bisecting the cylinder; and a boost port in communication between the crankcase and the cylinder and disposed between the transfer ducts and the fuel injectors, the boost port being intersected by the plane bisecting the cylinder, the transfer ducts and the fuel injectors being symmetrically disposed on either side of the boost port, wherein, for each transfer duct, as the piston moves in the cylinder, gases flow through each transfer duct in a first direction from the crankcase into the cylinder, fuel is injected into the transfer duct in a second direction, and the injection of fuel in the second direction is across and partly against the flow of gases in the first direction.

19. The engine of claim 18, wherein the fuel injectors inject fuel in a direction substantially parallel to the plane bisecting the cylinder.

20. The engine of claim 18, wherein the fuel injectors are disposed substantially parallel to one another.

21. The engine of claim 18, further comprising:

a fuel rail, wherein the fuel injectors are connected to the fuel rail.

22. The engine of claim 18, wherein: the transfer ducts each define an upper edge; and the fuel injectors each open into the respective transfer ducts through the upper edges thereof.

23. The engine of claim 22, wherein each fuel injector is disposed at an angle from horizontal between 20° and 50°.

24. The engine of claim 23, wherein the angle is about 35°.

25. The engine of claim 18, further comprising:

an exhaust port intersected by the plane bisecting the cylinder on a side of the cylinder opposite to where the transfer ducts open into the cylinder, wherein the exhaust port permits egress of burnt gases from the cylinder after combustion, and wherein the flow of gases in the first direction from the transfer ducts acts as a barrier inhibiting flow of fuel through the exhaust port before combustion thereof.

26. The engine of claim 18, wherein: the fuel injectors comprise a first and a second fuel injector, the first fuel injector is adapted to inject fuel at a first rate, the second fuel injector is adapted to inject fuel at a second rate, and the first rate does not equal the second rate.

27. The engine of claim 26, wherein the first rate is smaller than the second rate.

28. The engine of claim 18, wherein: the fuel injectors comprise a first and a second fuel injector, the first fuel injector is adapted to operate within a first range of engine operating conditions, and the second fuel injector is adapted to operate within a second range of engine operating conditions.

29. The engine of claim 28, wherein: the first range of engine operating conditions includes all engine speeds and loads, and the second range of engine operating conditions includes only high engine speeds and loads.

30. The engine of claim 29, wherein: the first fuel injector is adapted to inject fuel at a first rate, the second fuel injector is adapted to inject fuel at a second rate, and the second rate is greater than the first rate.

31. The engine of claim 18, wherein: the fuel injectors comprise a first and a second fuel injector, and the first fuel injector is adapted to operate alternatively with the second fuel injector.

32. The engine of claim 31, wherein: the first and second fuel injectors alternate injecting fuel so that each injector injects fuel on every other combustion cycle.

33. The engine of claim 18, wherein the fuel injectors open into the respective transfer ducts at a point where gas flowing through the transfer ducts moves at its greatest velocity.

* * * * *